UNITED STATES PATENT OFFICE.

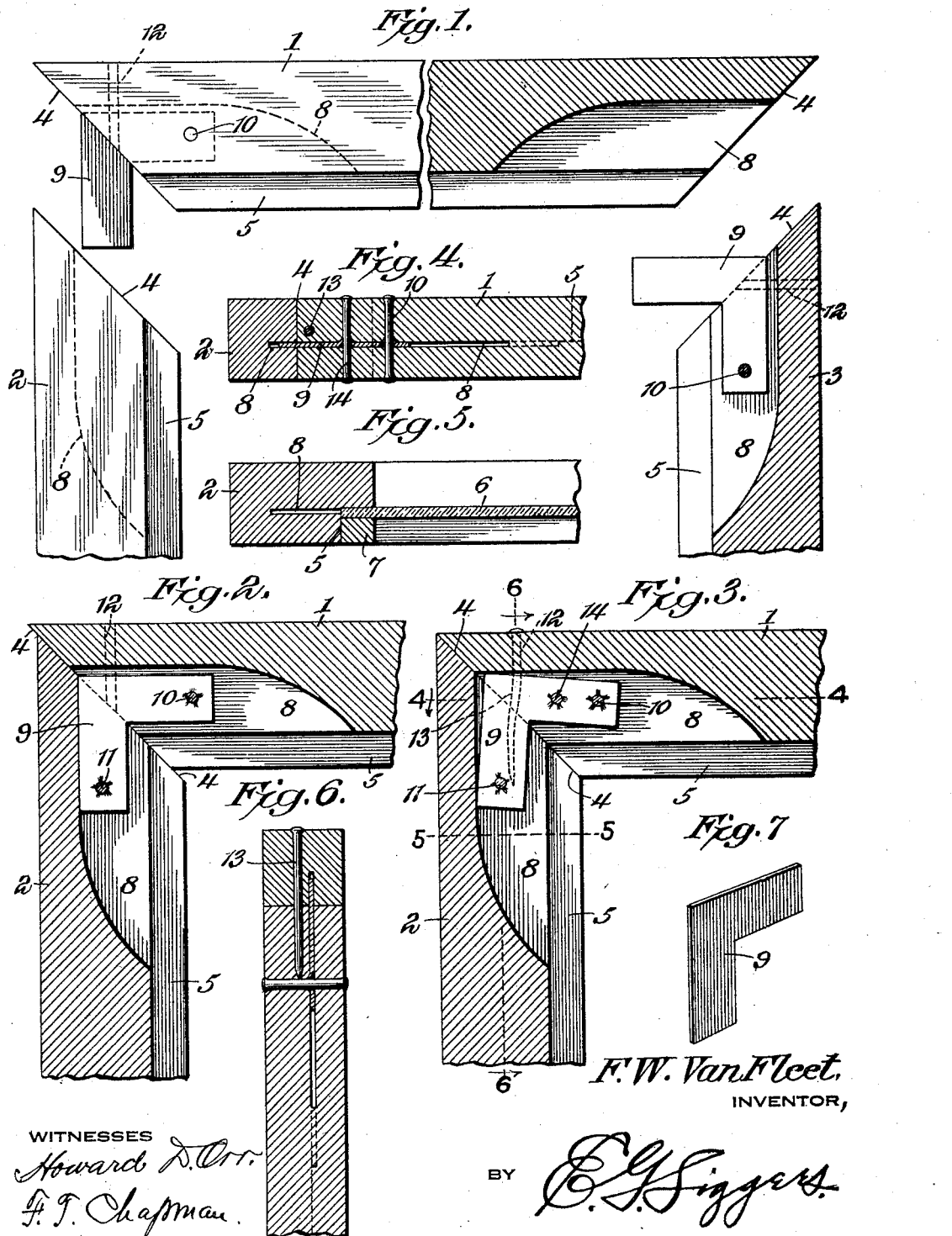

FREDERICK W. VAN FLEET, OF TOLEDO, OHIO.

FRAME FOR WINDOW-SCREENS AND METHOD OF MAKING SAME.

1,385,958.      Specification of Letters Patent.      Patented July 26, 1921.

Application filed April 24, 1920. Serial No. 376,282.

*To all whom it may concern:*

Be it known that I, FREDERICK W. VAN FLEET, a citizen of the United States, residing at Toledo, in the county of Lucas and State of Ohio, have invented new and useful Frames for Window-Screens and Methods of Making Same, of which the following is a specification.

This invention refers to a corner fastening for window screen frames and other similar structures and its object is to provide a knock-down frame which may in most part be formed at the factory and fitted with little labor to the window, or door, or other opening where it is to be used. The construction is such that the corner fastening is practically a blind fastening, for the frame may be so put together that the fastening means are entirely concealed or hidden.

It is customary to form knock-down frames with corner fastenings, the frame being so made as to carry netting, or glass, or some other material, and the rails of the frame can be obtained upon the market in suitable lengths to make various sizes of frames. The invention has reference to such style of knock-down frame and, in preparing the rails, they are mitered at the ends and rabbeted along the inner edges and at the corners have saw kerfs produced therein to receive a sheet metal member which may be housed in the meeting ends of the kerfs in two adjacent rails, being held in place by pins driven through the rails and through the metal connecting piece. The rails are first connected, with the mitered end of one projecting a short distance beyond the mitered end of the other along the plane of the miter joint, after which the miter joint is trued up by means of a nail or dowel pin driven lengthwise of one of the rails so as to cause the other rail to slide along the matching rail until the joint is true and the nail or pin is seated in the joint or may be countersunk therein sufficiently to receive putty or the like to conceal the outer end of the pin. The truing of the joint causes a tilting of the connector, which may be of right-angular shape and secured at the end of each leg by a pin to the respective rail. For further security and rigidity a third pin may be driven through one of the rails and the sheet metal connector.

Such a frame has proven in practice to be a particularly rigid frame resistant to distorting forces.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

Referring to the drawings:

Figure 1 is a plan view of the adjacent ends of the meeting rails of the frame, the opposite end of one of the rails being also shown in longitudinal section and the end of a third rail being also shown in longitudinal section.

Fig. 2 is a longitudinal section of the joined meeting ends of two rails while still somewhat askew.

Fig. 3 is a view similar to that of Fig. 2 but with rails trued and a holding nail or pin driven home.

Fig. 4 is a section on the line 4—4 of Fig. 3.

Fig. 5 is a section on the line 5—5 of Fig. 3 showing a pane of glass seated in the frame.

Fig. 6 is a section on the line 6—6 of Fig. 3.

Fig. 7 is a perspective view of one of the sheet metal angle corner connectors.

Referring to the drawings:

There are shown three rails, 1, 2 and 3. The rail 1 may be taken as a top rail and the rails 2 and 3 as opposite side rails. However, all the rails are alike with the single exception that opposite rails may be of different lengths. For example, the rails of a window screen are usually of two lengths since a window opening is customarily oblong in the direction of its height, and it is so seldom that a window opening is square that the nearest standard oblong frame may be cut down to fit. Knock-down screen frames are usually furnished in suitable sizes which may vary by 2″ each way but the opposite rails may have greater variation.

Since the rails in their general construction are all alike, a description of one will apply to all the others, sizes being ignored. Each rail is conveniently made of wood of rectangular cross section and suitable length and is cut off at each end to form a miter 4. Along the short edge of the rail there is formed a rabbet 5 of suitable width and depth to accommodate wire screening (not shown in the drawings), or a pane of glass 6 indicated in Fig. 5. or other window closure. In such case the wire screening may be nailed or tacked in, as is customary, and the rabbet filled up with a suitable bead 7 shown in conjunction with Fig. 5 as employed to hold the glass pane 6 in the frame. The bead may be conveniently formed out of the strip cut from the rail to produce the rabbet, but such arrangement does not form part of the invention although it serves to conserve material.

Formed into each end of each rail is a groove 8 which may be so situated as to about match the inner edge of the rabbet 5. The groove 8 is conveniently formed by a saw, usually a circular saw, against which the ends of the rail are fed until the groove 8 is of sufficient length, such length being enough to permit the formation of frames of different sizes, from a standard length of rail. For instance, a bundle of rails furnished by the factory may consist of four rails each of the same length, or two of a standard length and two shorter rails. Another bundle will include a similar assortment but of different lengths from the first bundle, and so on. With an assortment of bundles of rails a great variety of frames of different sizes may be made, frames of smaller sizes than the largest being made by cutting off one end of the rails as needed, the cut being a miter cut. For this reason the kerf at one end of a rail may be made considerably longer lengthwise of the rail than at the other end. Each rail when at the factory is provided with an angle corner piece 9 of sheet metal of suitable gage for the purpose and such corner piece is securely fastened in the miter end of one of the saw kerfs by a pin or dowel 10 which, for purposes of strength, may be a metal pin. In securing the angle piece in place a hole may be punched in that leg of the angle piece inserted in the saw kerf, by means of a suitable sharp implement. Since the rails are of wood the nails 10 may be readily driven through the wood and through the hole in the angle piece provided for the purpose. In punching the holes by means of a sharp implement, such holes are more or less ragged and bowed to one side as indicated at 11, this serving to anchor the angle piece in one side wall of the rail against future displacement of enough extent to permit the loss of the angle piece during transportation.

Now the miter end of the opposing rail free from an angle piece 9 is presented endwise to the end of the first rail provided with the angle piece then serving as a tenon, so that it will enter the mortise of the presented rail formed by the saw kerf in such end. Then that rail containing the angle piece 9 is so applied that when the tenon end of the angle piece is abutted against the bottom of the saw kerf, or mortise, the point of the miter edge of the rail carrying the tenon projects a slight distance beyond the corresponding end of the rail into which the tenon was introduced. In securing the angle piece 9 to the first named rail care is taken that it shall be placed a short distance from the bottom of the saw kerf, thus giving a certain freedom of movement about the dowel pin 10.

The rails are also each provided with a preformed hole 12 perpendicular to the long side of the rail and so located as to be about midway of the miter wall 4 and perpendicular to the longitudinal center line of the rail. The purpose of the hole 12 is to receive a nail or dowel pin 13 to be driven in when the two rails have been abutted and a second nail or dowel pin has been driven through the second rail and the intervening leg of the angle connector 9.

In driving the pin 13 home, it first traverses the hole 12, so as to be guided alongside of one leg of the angle piece or plate 9, which angle piece is held by two nails or dowels 10 and 11 traversing the legs of the angular piece or plate. Because of the abutting miter ends of the meeting rails, the latter are caused to slide one on the other in driving the nail 13 home, the action causing the nail to bend somewhat until the miter joint is trued, in which position the dowels 10 and 11, the angle piece or plate 9 and the nail 13 coact to render the joint rigid. The initial and finishing positions are shown in Figs. 2 and 3, respectively, and in Fig. 3 the tilted position of the corner plate 9 is indicated.

While for many purposes the nail or dowel 13 will hold a frame true, it is advisable to drive another nail or dowel 14 through one leg of the angle piece connector 9 in the same leg to which one of the pins 10 or 11 has already been driven. This produces a particularly stiff and unyielding joint which, even under unusually hard conditions will maintain its shape.

When wire screen is mounted in the frame it is ordinarily unnecessary to use the pin 14, but if glass be employed it may be advisable to use the pin 14 in order to avoid any undue strain upon the glass, due to distorting forces to which the frame may be subjected.

To produce an entirely blind joint the nails or dowels may be countersunk at their outer ends and the holes filled with putty or other material which become invisible when the frame is painted.

The invention has the advantage of being capable of embodiment in a practical form very cheaply, and of producing a structure, for the purpose, of exceptional strength and rigidity so as to resist for a long time destructive conditions to which structures of this character are liable to be subjected.

The invention is applicable to window screens, door screens, window sash, storm sash and other like purposes.

The arrangement is such that the sash or frame may be largely factory made and may be shipped in the knocked-down condition, thus materially saving in transportation charges. Moreover the frame may be set up and properly trued even by those unskilled in the making of frames.

While a few examples of the uses to which the invention may be put have been given, it is to be understood that this in no wise precludes the use of the invention for other purposes of similar nature.

What is claimed is:

1. A window or other sash frame, comprising rails each with a miter end having a narrow cut lengthwise thereinto for a portion of the width of the rail, angular corner pieces of sheet metal with leg portions entering meeting cuts at the miter ends of the rails, pins traversing the rails and leg portions of the corner pieces, and a nail or pin extending through one miter end of each joint and entering the miter end of the other rail completing the joint.

2. The method of constructing window and other sash frames of rails with miter ends and blind reinforcements, consisting in producing narrow cuts lengthwise into the miter ends of the rails, introducing corner pieces into the narrow cuts where meeting, with the corner pieces held in place by pins traversing the rails and the leg portions of the corner pieces and with the miter ends and corner pieces out-of-true, and then driving elongated fastening means into the miter joints through one member of each joint lengthwise into the other member of the joint, whereby the slip of the miter ends one on the other and the rocking of the angle members causes the out-of-true joint to move into and be held in the true position in firm connection.

3. A window or other sash frame, comprising rails each with a miter end having a narrow cut lengthwise thereinto for a portion of the width of the rail from the inner edge thereof, angular corner pieces of sheet metal with leg portions entering meeting cuts at the miter joints and the angle corner pieces having holes punched therethrough to produce ragged edges about the holes, pins driven through the rails adjacent to the miter edges and traversing the holes in the corner pieces, and a nail or pin extending through one miter end of each joint of the frame and entering the miter end of the rail completing the joint lengthwise of said rail, and the corner piece being tilted with relation to the miter joint with the joint itself true.

In testimony, that I claim the foregoing as my own, I have hereto affixed my signature.

FREDERICK W. VAN FLEET.